E. MORLEY.
AIR HEATING APPARATUS.
APPLICATION FILED JUNE 18, 1918.
1,333,870.
Patented Mar. 16, 1920.
2 SHEETS—SHEET 1.
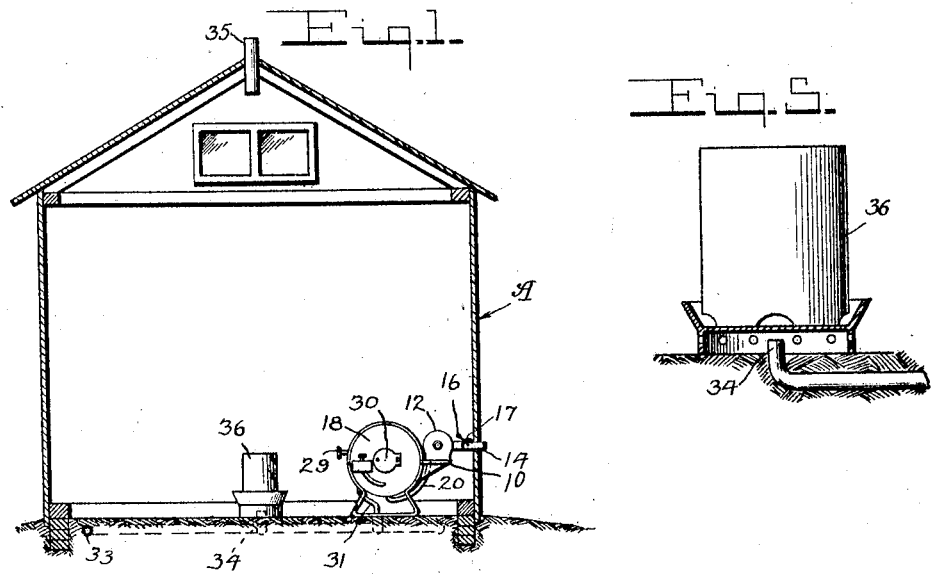
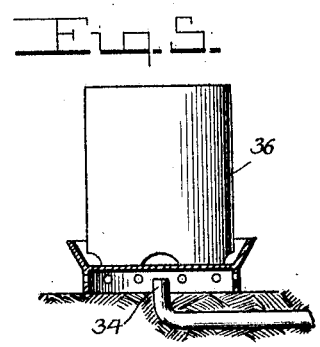
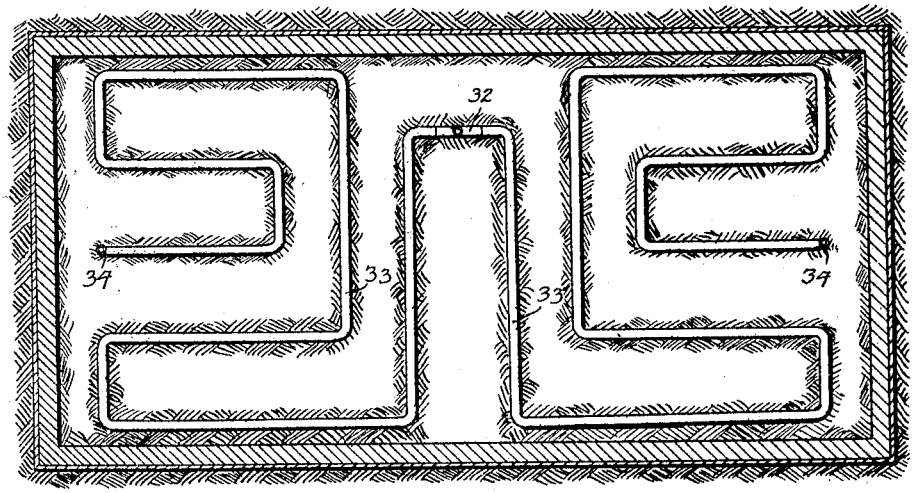
Inventor
E. Morley
Attorney
Witness E. MORLEY.
AIR HEATING APPARATUS.
APPLICATION FILED JUNE 18, 1918.
1,333,870.
Patented Mar. 16, 1920.
2 SHEETS—SHEET 2.
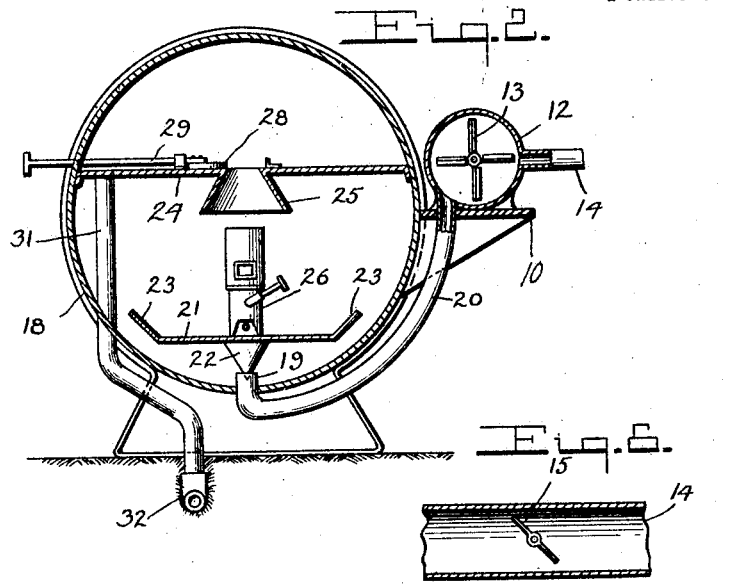
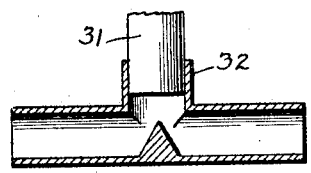
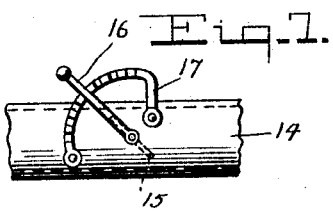
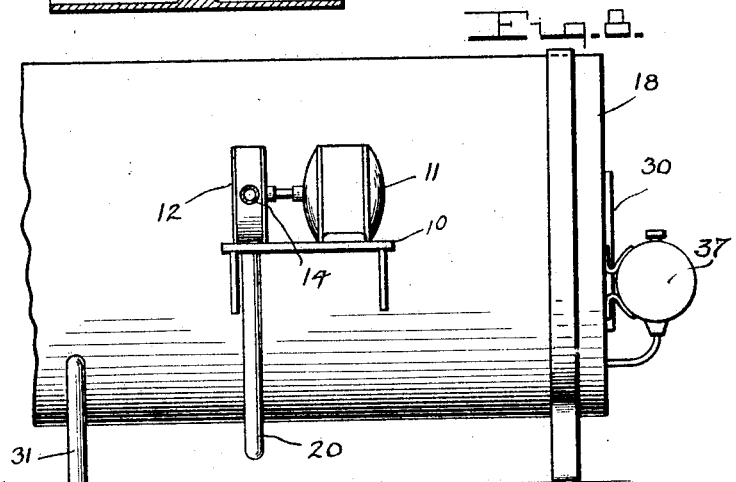
Witness
R. M. Jones
F. O. Parker
Inventor
E. Morley
By Chandler & Chandler
Attorney

UNITED STATES PATENT OFFICE.

EDGAR MORLEY, OF GOODRICH, NORTH DAKOTA.

AIR-HEATING APPARATUS.

1,333,870.   Specification of Letters Patent.   Patented Mar. 16, 1920.

Application filed June 18, 1918. Serial No. 240,714.

*To all whom it may concern:*

Be it known that I, EDGAR MORLEY, a citizen of the United States, residing at Goodrich, in the county of Sheridan, State of North Dakota, have invented certain new and useful Improvements in Air-Heating Apparatus; and I do hereby declare the following to be a full, clear, and exact description of the invention, such as will enable others skilled in the art to which it appertains to make and use the same.

The invention relates to air heating apparatus, more particularly for use in poultry houses, hog houses, buildings or the like.

One object is to provide an apparatus of this kind whereby the warm air heated thereby and admitted from without will be maintained at a proper temperature and the supply of air can be conveniently regulated or shut off as the occasion may require.

A further object of the invention is the provision of an apparatus of this character which is comparatively simple in construction, thoroughly reliable and efficient in operation, and inexpensive to manufacture and install.

With these and other objects in view, the invention consists in the features of construction, combination and arrangement of parts as will be hereinafter fully described, illustrated in the accompanying drawings, and pointed out in the claims hereunto appended.

In the accompanying drawings:—

Figure 1, is a vertical sectional view of an inclosure constituting a chicken house and an elevation of its heating apparatus constructed in accordance with the invention.

Fig. 2, is a vertical sectional elevation taken through a portion of the apparatus.

Fig. 3, is a horizontal sectional view through the floor of the inclosure showing the air circulating pipes and outlets therefor.

Fig. 4, is an enlarged vertical sectional elevation showing the branch distributer for the heated air.

Fig. 5, is an enlarged vertical sectional view at one outlet for the heated air.

Fig. 6, is a fragmentary sectional view through the inlet pipe showing the damper therein.

Fig. 7, is a fragmentary side elevation of the inlet pipe showing in detail the manner of adjusting the damper, Fig. 8, is a fragmentary elevation of the heated drum and adjunct parts.

Referring to the drawings in detail, A, designates generally, a portion of a building or house for fowls or animals and the like, and suitably supported within the same upon a shelf 10, is a motor 11, preferably of the electric type and operated in any suitable manner through the medium of a switch controlled circuit, (not shown), while at one side of the motor 11, upon the shelf 10, is a fan casing 12, in which is arranged a rotary fan 13, operated by the driving shaft of the motor 11. Communicating with casing 12, is an air inlet pipe 14, which opens into the atmosphere and within this pipe is arranged a vertical swinging damper 15. Fixed on the axle or pivot thereof exteriorly of said pipe 14 is a hand lever or arm 16 which rigidly engages a segmental toothed rack 17 so that the damper 15 can be held fast in adjusted position, and in this manner the intake of air can be regulated or shut off as the occasion may require.

Located within the building A elevated from the floor or foundation is a cylindrical airtight drum 18 through the bottom of which projects the vertical air inlet 19 of a supply pipe 20 which leads from the fan casing 12 at the periphery thereof so that the air drawn in by the fan 13 will be forced through the pipe 20 and inlet 19 into the drum 18 for the heating of the air and the distribution thereof in a manner presently described.

Arranged within the drum 18 above the inlet 19 is a baffle or deflector plate 21 formed with a depending inverted substantially cone shaped spreader 22 for the inlet 19 so as to divide or break up the direct course of the air admitted into the drum 18 from the pipe 20, the deflector or baffle plate 21 being formed with the upwardly divergent end wings 23 which are spaced from the wall of the drum 18 and form passages for the upward travel or course of the air admitted to the drum.

Within the drum 18 above the baffle or deflector plate 21 is a horizontal partition 24 which is formed with a central opening surrounded by a conical shaped cowl or funnel 25. Beneath the funnel is arranged a heater 26 supported upon the baffle or deflector plate 21 so that the air entering the cowl or funnel 25 will become heated on the ascent of the air into the upper portion of the drum 18, the opening or orifice of the cowl or funnel 25 being controlled through the medium of a slide valve 28 operated from a hand rod 29 extended exteriorly of the drum 18. The drum 18 is provided with a door 30 so that access may be had thereto when the occasion requires. Opening through and supported from the partition 24 for communication with the upper portion of the drum 18 is an outlet pipe 31 which extends downwardly into the foundation or floor of the building A and has connected thereto an inverted substantially T-shaped branch union 32 to the ends of which are connected the warm air distributing pipes 33 which extend in irregular courses in the foundation or flooring beneath the tile or other surface thereof, and the terminals of these pipes 33 extend upwardly through the foundation or flooring and form outlets 34 for the warm or heated air for circulation within the building A, as will be apparent. Extending centrally upwardly through the roof or top of the building A is an outlet flue 35 for the escape of all foul air and the spent warm air from within the building.

Located over each outlet 34 within the building A is a drinking fountain or water reservoir 36 for the fowls or animals. This may be of any approved type, the water therein being warmed and heated by the air admitted into the building from the ventilating and heating system.

The heater 26 may be of any approved type and can be regulated by an operator to vary the temperature within the building.

It is of course understood that the invention is adaptable to various buildings for different purposes, as for example in brooders for little chicks or for the raising of young animals. The warm air in its circulation through the pipes 33 will heat the floor or foundation and a circulation of the air in the building will assure the proper temperature therein, and likewise the water for drinking purposes will be prevented from freezing and properly warmed.

From the foregoing it is thought that the construction and manner of operation of the apparatus will be clearly understood, and therefore a more extended explanation has been omitted.

Mounted at a convenient point is a fuel reservoir 37 which has a pipe leading to the burner of the heater 26 for supplying fuel thereto.

What is claimed is:—

1. In a device of the class described, a motor, a blower operated by said motor, an air inlet pipe for said blower, an outlet pipe leading from said blower, an airtight drum adapted to be located within an inclosure and having said air outlet pipe opening thereinto, means within the drum for deflecting the air upwardly, a heater within said drum, a partition arranged in the drum above the heater, and a funnel for directing the air upwardly through said partition.

2. In a device of the class described, a motor, a blower operated by said motor, an air inlet pipe for said blower, an outlet pipe leading from said blower, an airtight drum having said outlet pipe opening thereinto, a baffle plate across the drum, a conical spreader carried by the plate and depending into said outlet for deflecting the air, a heater within said drum, a partition in the drum above the heater and having an opening through it, and a funnel for directing the air upwardly therethrough.

3. In a device of the class described, a motor, a blower operated by said motor, an air inlet pipe for said blower, an outlet pipe leading from said blower, an airtight drum having said air outlet pipe opening thereinto, a baffle plate within the drum for deflecting the air, a heater upon the baffle, a partition in the drum having an opening above the heater, a funnel depending from the partition around its opening for directing the air upwardly therethrough, a slide valve above said partition for regulating said opening, and means in the inlet pipe for regulating the air admitted to the fan.

4. In a device of the class described, a drum, an air inlet pipe for the same, means within the drum for deflecting the air, a heater within said drum, a partition in the drum above the heater and having a funnel for directing the air upwardly therethrough to the space above said partition, and means in the inlet pipe for regulating the air admitted.

5. In a device of the class described, a drum, an air pipe opening thereinto, a heater within said drum, a partition in the drum having an opening above the heater, a funnel for directing the air upwardly through opening, means for controlling the size of this opening, and means in the inlet pipe for regulating the air admitted.

6. In a device of the class described, a drum, an air inlet pipe opening through its bottom, a partition across its interior provided with an opening, and an outlet pipe leading from a point above said partition; combined with a baffle plate within the drum above said inlet pipe and having up-bent wings at its edges, a heater resting on the plate beneath said opening, and means for controlling the latter.

7. In a device of the class described, a drum, an air inlet pipe opening through its bottom, a partition across its interior provided with an opening, and an outlet pipe leading from a point above said partition; combined with means exterior of the drum for controlling the air admitted, a baffle plate within the drum above said inlet pipe and having upbent wings at its edges, a heater resting on the plate beneath said opening, a slide valve on the partition adapted to control said opening, a hand rod extending from the valve to the exterior of the drum, and a fuel tank on the exterior of the drum piped to the burner in said heater.

In testimony whereof, I affix my signature, in the presence of two witnesses.

EDGAR MORLEY.

Witnesses:
W. W. HARRIS,
J. C. SCHLENKER.